(12) United States Patent
Ogino (10) Patent No.: US 10,496,907 B2
(45) Date of Patent: Dec. 3, 2019

(54) ELECTRONIC APPARATUS AND METHOD FOR MANAGING POWER SUPPLY

(71) Applicant: Tatsuya Ogino, Saitama (JP)

(72) Inventor: Tatsuya Ogino, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 15/647,378

(22) Filed: Jul. 12, 2017

(65) Prior Publication Data

US 2018/0025259 A1    Jan. 25, 2018

(30) Foreign Application Priority Data

Jul. 20, 2016  (JP) .................................. 2016-142427
Mar. 10, 2017  (JP) .................................. 2017-046232

(51) Int. Cl.
| | |
|---|---|
| *G06F 1/26* | (2006.01) |
| *G06F 1/32* | (2019.01) |
| *G06K 15/00* | (2006.01) |
| *G03G 15/00* | (2006.01) |
| *G06K 15/14* | (2006.01) |

(52) U.S. Cl.
CPC ......... *G06K 15/4055* (2013.01); *G03G 15/50* (2013.01); *G03G 15/5004* (2013.01); *G03G 15/80* (2013.01); *G06K 15/14* (2013.01)

(58) Field of Classification Search
CPC .... G03G 15/50; G03G 15/5004; G03G 15/80; G06K 15/14; G06K 15/4055; G06F 1/26; G06F 1/32; G06F 1/3296
See application file for complete search history.

(56) References Cited

U.S. PATENT DOCUMENTS

2012/0321337 A1*  12/2012  Uezono ................. G03G 15/80
                                                    399/88
2015/0212476 A1    7/2015  Ishii

FOREIGN PATENT DOCUMENTS

| JP | 2004-048888 | 2/2004 |
|---|---|---|
| JP | 2015-141515 | 8/2015 |
| JP | 2015-167430 | 9/2015 |

* cited by examiner

*Primary Examiner* — Fahmida Rahman
(74) *Attorney, Agent, or Firm* — Oblon, McClelland, Maier & Neustadt, L.L.P.

(57) ABSTRACT

An electronic apparatus includes a convertor, and a discharge circuit, and a controller. The convertor controls supply of power to a load according to one of a state of a switch and an operational mode of the electronic apparatus. The discharge circuit discharges a capacitor of a power supply when the convertor stops operating. The controller detects completion of discharge performed with the discharge circuit according to a voltage in the discharge circuit, and restores operation of the convertor in response to a detection of the discharge completion detector indicating the completion of the discharge of the capacitor, when the switch is in the closed state or when the operational mode is switched from the sleep mode to the operating mode.

6 Claims, 7 Drawing Sheets

ELECTRONIC APPARATUS AND METHOD FOR MANAGING POWER SUPPLY

CROSS-REFERENCE TO RELATED APPLICATIONS

This patent application is based on and claims priority pursuant to 35 U.S.C. § 119(a) to Japanese Patent Application Nos. 2016-142427, filed on Jul. 20, 2016, and 2017-046232, filed on Mar. 10, 2017, in the Japan Patent Office, the entire disclosures of which are hereby incorporated by reference herein.

BACKGROUND

Technical Field

Embodiments of the present disclosure relate to an electronic apparatus and a method for managing power supply.

Related Art

In a known image forming apparatus, an image forming device (load circuit), which is an output terminal of a power supply system (power supply management device) or a destination module of a power supply, is generally connected to a capacitor to stabilize the power supply.

Additionally, such a general-purpose image forming apparatus includes an interlock switch that connects a power supply to the load circuit in conjunction with opening and closing of a cover. The interlock switch switches off to disconnect the power supply from the load circuit so as not to output the power from the power supply to the load circuit when the cover is open, and switches on to output the power to the load circuit from the power supply when the cover is closed.

SUMMARY

An electronic apparatus includes a cover to open or close, a convertor, and a discharge circuit, and a controller. The convertor controls supply of power to a load according to one of a state of a switch and an operational mode of the electronic apparatus. The state of the switch is switched according to opening or closing of the cover. The convertor supplies the power when the switch is in a closed state or when the operational mode is an operating mode causing a load output, and stops supplying the power when the switch is in an open state or the operational mode is in a sleep mode causing the load output to stop. The discharge circuit discharges a capacitor of a power supply when the convertor stops operating. The controller detects completion of discharge performed with the discharge circuit according to a voltage in the discharge circuit, and restores operation of the convertor in response to a detection of the discharge completion detector indicating the completion of the discharge of the capacitor, when the switch is in the closed state or when the operational mode is switched from the sleep mode to the operating mode.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An electronic apparatus and a method for managing power supply according to embodiments of the present disclosure are described in detail with reference to the drawings. In the following description of the embodiment, an image forming apparatus is used as one example of the electronic apparatus of the disclosure. However the electronic apparatus according to the embodiments of disclosure is not limited to an image forming apparatus, and other types of electronic apparatus also may be used.

Figure 1:
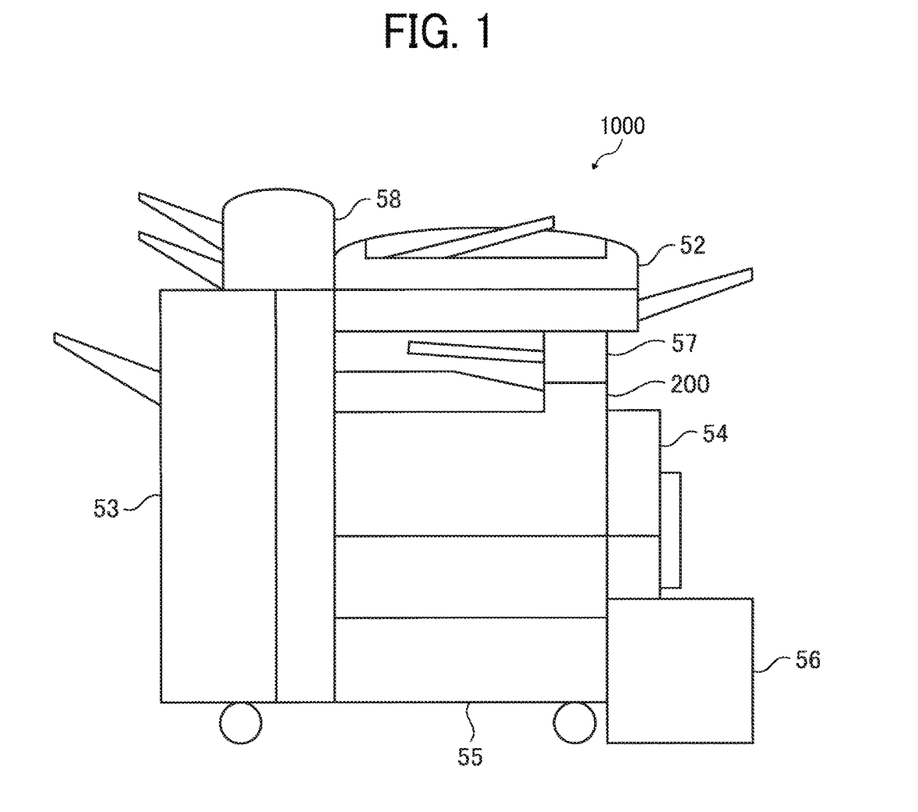
FIG. 1 is a diagram schematically illustrating an image forming apparatus according to an embodiment of the present disclosure.

FIG. 1 is a diagram schematically illustrating an image forming apparatus 1000 according to an embodiment of the disclosure. The image forming apparatus 1000 receives a job, requesting operation as a copier, a printer, or a facsimile communication device, input by a user, and outputs an image, for example prints out the image on a recording medium such as a sheet of paper.

As described in FIG. 1, the image forming apparatus 1000 includes an image forming device 200, an automatic document feeder (ADF) 52, a finisher 53 including a stapler and a shift tray, a duplex switchback unit 54, an extendable paper feeding tray 55, a large-capacity paper feeding tray LCT 56, an one-bin paper discharge tray 57, and an insert feeder 58.

The image forming device 200 includes a scanner to read a document, a printer engine device including components such as an optical writing unit, a photoconductor and a developing unit, to print out electrophotographically, and a sheet feeding device.

The image forming device 200 includes a controller 30 (see FIG. 2) to control the overall operation of the apparatus 1000. The controller 30 receives a job input, and controls each component in association with an image output process to output a sheet, or print out, according to the job instructions. Additionally, the controller 30 maintains and manages apparatus conditions so that each component operates appropriately.

The controller 30 is implemented by a computer mounted on a controller board provided in the image forming device 200. The computer includes a central processing unit (CPU), a read only memory (ROM) that operates under control of the CPU, and a dynamic random access memory (DRAM), as configuration elements.

The ROM controls the printer engine and the sheet feeding device, and stores programs and data to be used by the CPU to process image data for printing. Additionally, when the CPU of the computer processes data (signals) in relation to operation of a power supply circuit, which is described later, the ROM stores a program for processing this data.

The DRAM serves as a memory to temporarily store data generated by executing the programs by the CPU, or a work memory to store data necessary to drive the program.

Figure 2:
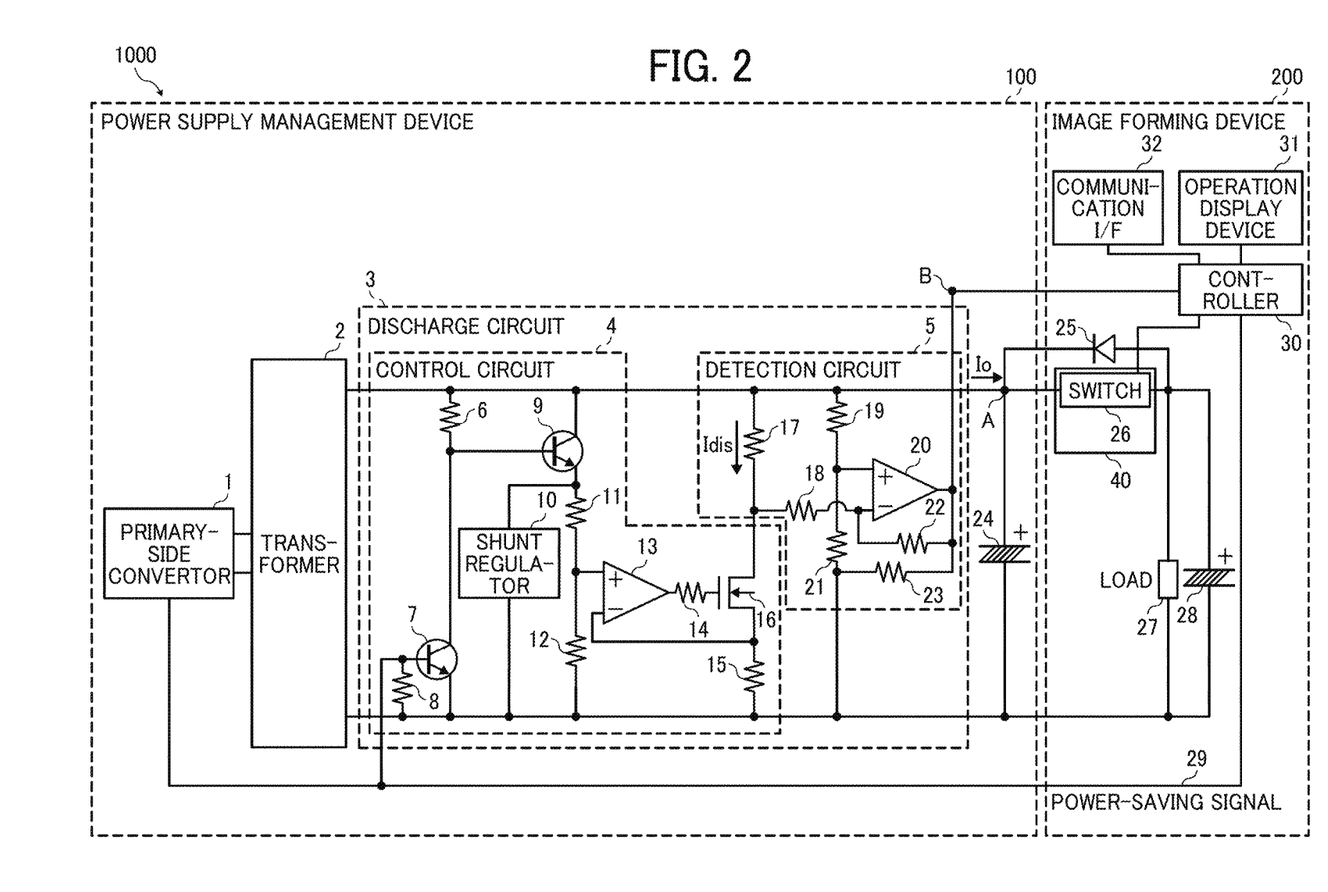
FIG. 2 is a diagram schematically illustrating a configuration of a power supply circuit of the image forming apparatus.

FIG. 2 is a schematic diagram illustrating a configuration of the power supply circuit of the image forming apparatus 1000. The image forming apparatus 1000 includes a power supply management device 100 that supplies power to the image forming device 200.

As described in FIG. 2, the image forming device 200 mainly includes a diode 25, a switch 26, a load circuit 27, a second capacitor 28, and the controller 30. The switch 26 and the diode 25 are connected in parallel. The load circuit 27 and the second capacitor 28 are also connected in parallel. In addition to the switch 26, an operation display device 31 and a communication interface (communication I/F) 32 are connected to the controller 30.

The switch 26 is an interlock switch that detects a state, open or closed, of a cover 40 of the image forming device 200. The cover 40 opens to expose an interior of the ADF 52, the finisher 53, the duplex reversing unit 54, the extended paper feeding tray 55, the large-capacity paper feeding tray LCT 56, the one-bin paper discharge tray 57, and the insert feeder 58. The cover 40 opens to expose an interior of the image forming device 200 whenever a toner cartridge is replaced, for example. When the cover 40 is opened, the switch 26 is in an open state. When the cover 40 is closed, the switch 26 is in a closed state.

Here, although the state of the switch 26 is switched between the open state and the closed state in conjunction with a state of operation (open or closed) of the cover 40, a method of switching the state of the switch 26 is not limited thereto. For example, the state of the switch 26 may be switched in conjunction with a state of operation of a drawing unit of the large-capacity paper feeding tray LCT 56. In the embodiment, the drawing unit (cover) of the large capacity paper feeding tray LCT 56 is used as one example of the cover 40. The load circuit 27 is, accordingly, one example of the drawing unit requiring the power.

A power-saving (energy-saving) signal 29 is a control signal that is output from the controller 30 to limit the power supply during a job waiting time. A state of the power-saving signal 29 can be switched depending on whether the switch 26 is open or closed, and also by the controller 30.

The controller 30 switches the power-saving signal 29 to be output between a HIGH state and a LOW state depending on whether the switch 26 is open or closed. For example, when the switch 26 is in the open state when the cover 40 is open, the controller 30 outputs the HIGH state of the power-saving signal 29 to a primary-side convertor 1. On the other hand, with the switch 26 is in the closed state when the cover 40 is closed, the controller 30 outputs the LOW state of the power-saving signal 29 to the primary-side convertor 1.

Regarding the switching of the state of the power-saving signal 29 by the controller 30, the controller 30 switches the state of the power-saving signal 29 to the HIGH state when the standby time of the image forming device 200 is equal to or more than a predetermined time.

Additionally, the controller 30 outputs the power-saving signal 29 (being the LOW state) to the primary-side convertor 1 when receiving the job from the communication I/F 32 or the operation display device 31.

The primary-side convertor 1 supplies a limited amount of power in a power-saving mode in response to the HIGH state of the power-saving signal 29. As the power-saving mode, several kinds of modes, implemented by known techniques, may be used. However, in the description of this embodiment, an operation stopping mode (sleep mode) to stop supplying the power to a secondary-side by stopping the operation of the primary-side convertor 1 is used.

The primary-side convertor 1 exits the power-saving mode if in the power saving mode, and restarts the power supply in an operating mode (normal mode or full mode) in response to the LOW state of the power-saving signal 29.

The controller 30 controls both the power supply management device 100 and the image forming device 200. For example, the controller 30 serves as a convertor controller that controls the primary-side convertor 1 by switching between the operating mode (normal mode, full mode) to output loads and the operation stopping mode (sleep mode), which is one of the power-saving modes, to stop outputting the loads.

The controller 30 also serves as a discharge completion detector that detects a completion of discharge by the discharge circuit 3 by reading a discharge detection signal output from the detection circuit 5 of the power supply management device 100. Details of the discharge detection signal are described later.

The controller 30, furthermore, serves as a power supply restoration device that causes the primary-side convertor 1 to restore the power supply operation if the discharge by the discharge circuit 3 of the power supply management device 100 is completed when the switch 26 turns to the closed state or the mode of the primary-side convertor 1 is switched from the sleep mode to the operating mode.

As illustrated in FIG. 2, the power supply management device 100 mainly includes the primary-side convertor 1, a transformer 2, the discharge circuit 3, and a first capacitor 24. The primary-side convertor 1 generates a switching output, transfers energy, or supplies power, to the image forming device 200 side, which is the secondary-side, via the transformer 2. The first capacitor 24 generates a direct current voltage by smoothing a voltage, and supplies the generated direct current voltage to the image forming device 200 side.

The discharge circuit 3 includes the control circuit 4 and the detection circuit 5. The control circuit 4 includes a first resistor 6, a first transistor 7, a second resistor 8, a second transistor 9, a shunt regulator 10, a third resistor 11, a fourth resistor 12, a first operational amplifier 13, a fifth resistor 14, a sixth resistor 15, and a field effect transistor (FET) 16.

In the control circuit 4, ON/OFF of the first transistor 7, ON/OFF of the second transistor 9, and ON/OFF of the FET 16 are controlled according to the state, HIGH/LOW, of the power-saving signal 29. When each of the above-mentioned elements is in an ON state, a discharge path that includes the sixth resistor 15, the FET 16, and a seventh resistor 17 connected in series becomes an ON state, in which the discharge is possible, and the first capacitor 24 and the second capacitor 28 start discharging.

The FET 16 is configured as a constant current discharge circuit that is controlled by the first operational amplifier 13 using a gate signal, and a drain current of the FET 16 is determined according to a voltage of a positive terminal of the first operational amplifier 13 and the sixth resistor 15. For example, when the voltage of the positive terminal of the first operational amplifier 13 is 1.2 V and a resistance of the sixth resistor 15 is 0.5Ω, a current flowing is 1.2 V/0.5 Ω=2.4 A.

The detection circuit 5 includes the seventh resistor 17, an eighth resistor 18, a ninth resistor 19, a tenth resistor 21, an eleventh resistor 22, and a twelfth resistor 23 and a second operational amplifier 20. The detection circuit 5 outputs the discharge detection signal to the controller 30 according to a drain current of the FET 16. A voltage of the discharge detection signal, namely a voltage at a point B is determined using the drain current of the FET 16 and values of the seventh resistor 17, the ninth resistor 19, and the tenth resistor 21.

For example, when the drain current of the FET 16 is 2.4 A, the resistance of the seventh resistor 17 is 0.5Ω, the resistance of the ninth resistor 19 is 10 kΩ, and the resistance of the tenth resistor 21 is the 30 kΩ, the voltage of the discharge detection signal, namely the voltage at the point B, is 2.4 A×0.5Ω×30 kΩ/10 kΩ=3.6 V.

Outputting the voltage to the controller 30 by the detection circuit 5 allows the operational state of the discharge circuit 3 to be communicated to the image forming device 200.

That is, the controller 30 detects that the discharge circuit 3 stops the discharge when the voltage at the point B in FIG. 2 is not a predetermined value, namely that the discharge detection signal is LOW. On the other hand, the controller 30 detects that the discharge circuit 3 is operating, or performing the discharge, when the voltage at the point B in FIG. 2 is the predetermined value, namely that the discharge detection signal is HIGH.

As described above, the power supply management device 100 communicates to the image forming device 200 side the operational state of the discharge circuit 3 by transmitting the discharge detection signal based on the voltage in the discharge circuit 3 to the controller 30 of the image forming device 200. As the discharge detection signal, for example, the voltage at the point B in FIG. 2 can be used. However, the discharge detection signal is not limited to the voltage at the point B but instead may be a value obtained by multiplying the voltage by a coefficient determined by the circuit configuration of the power supply management device 100 side, or by subjecting the voltage to processing such as digitization.

The discharge of the capacitor is now described with reference to timing charts.

Figure 3:
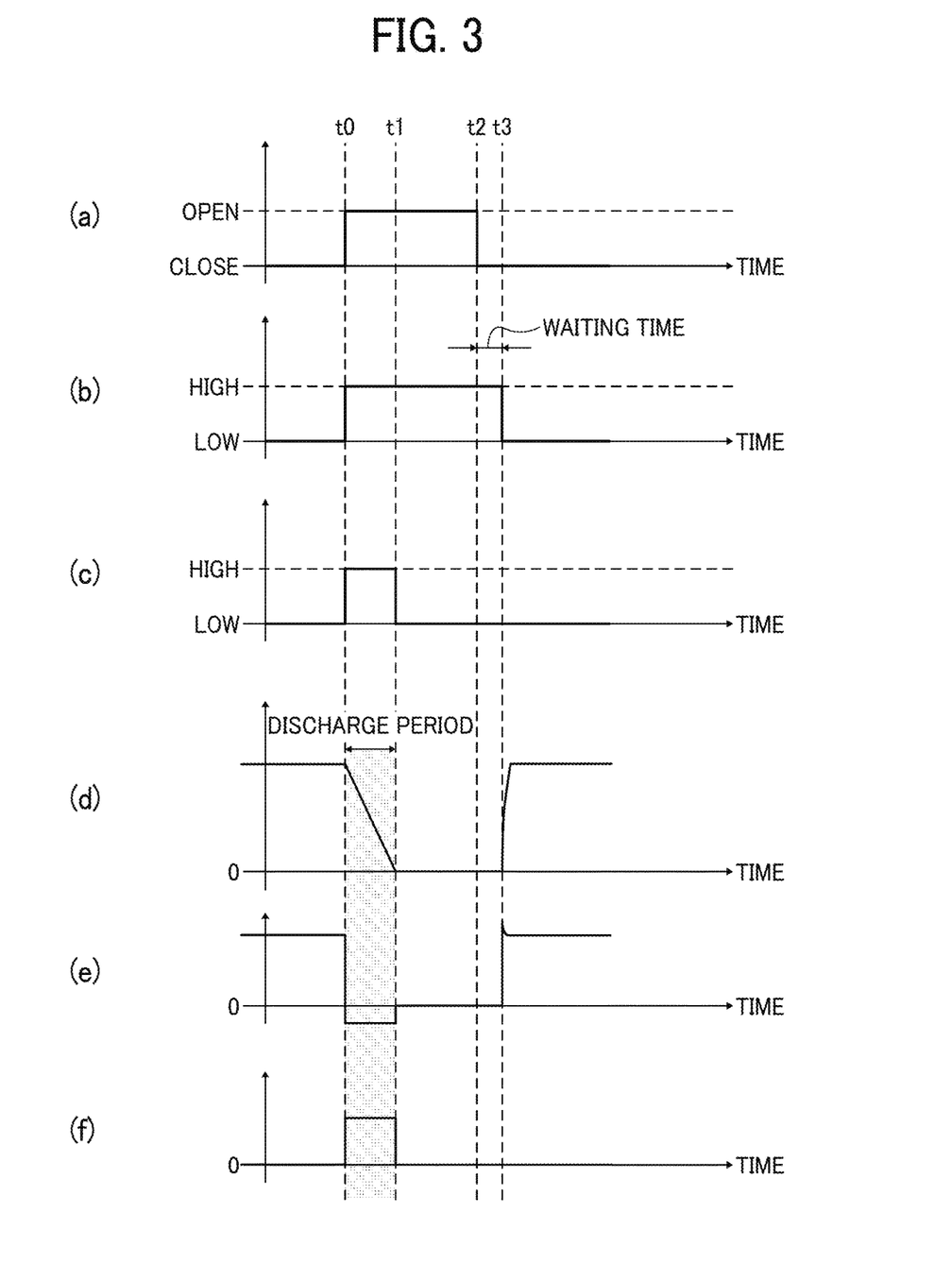
FIG. 3 is a timing chart illustrating changes in the state of the image forming apparatus when a cover is opened and closed.

FIG. 3 shows timing charts, (a) to (f), illustrating changes in the state of the image forming apparatus 1000 when the cover 40 is opened and closed. In FIG. 3, the timing chart (a) illustrates the state, open/closed, of the switch 26. In FIG. 3, the timing chart (b) illustrates the state, HIGH/LOW, of the power-saving signal 29. In FIG. 3, the timing chart (c) illustrates the state, HIGH/LOW, of the discharge detection signal. In FIG. 3, the timing chart (d) illustrates a voltage at a point A in FIG. 2. In FIG. 3, the timing chart (e) illustrates a state of current Io in FIG. 2. In FIG. 3, the timing chart (f) illustrates a state of discharge current Idis in FIG. 2.

When the cover 40 of the image forming device 200 is opened at a time t0, the switch 26 turns to the open state (OPEN) as illustrated with (a), and the power-saving signal 29 turns to the HIGH state as illustrated with (b). When the power-saving signal 29 is the HIGH state, the primary-side convertor 1 stops operating. When the power-saving signal 29 is the HIGH state and each element is an ON state, the discharge circuit 3 starts constant current discharging to discharge the charge stored in the first capacitor 24 and the second capacitor 28. As illustrated in with (f), the discharge current Idis flowing in the seventh resistor 17 is discharged from the time t0 to a time t1, namely until the discharge is completed.

The current Io in FIG. 2 starts flowing in an opposite direction when the primary-side convertor 1 starts driving (time t0), and the current Io has a negative value at time t0 as illustrated with (e). In addition, the value of the current Io flowing to the discharge circuit 3 from a first capacitor 24 side and a second capacitor 28 side stays in a certain negative value during a period of discharging due to the constant current discharging. As illustrated with (d), the voltage at the point A in FIG. 2 starts decreasing when the discharge starts at the time t0, and stays zero after the discharge finishes at the time t1.

By contrast, the voltage at the point B on the detection circuit 5 in FIG. 2, namely the discharge detection signal, is kept in the HIGH state after the discharge starts at the time t0 and then turns to the LOW state when the discharge is completed at the time t1. That is, the detection circuit 5 according to this embodiment outputs the HIGH state of the discharge detection signal to the controller 30 while the discharge circuit 3 is performing the discharge.

Subsequently, when the cover 40 is closed at a time t2 and the switch 26 turns to the closed state (CLOSE) as illustrated with (a), the power-saving signal 29 switched to the LOW state after a few milliseconds of wait time (delay time), at a time t3, as illustrated with (b). The wait time in the embodiment can be shorter than that in a conventional embodiment because the discharge detection signal is already switched to the LOW state and the discharge is already completed. Alternatively, the wait time may be eliminated altogether in this embodiment.

The primary-side convertor 1 starts charging at a time t3 and the discharge circuit 3 stops the discharge. Charging to the first capacitor 24 and the second capacitor 28 starts at the time t3, so that the voltage at the point A starts increasing as illustrated with (d), and the current Io (See FIG. 2) flowing to a load circuit 27 side of the image forming device 200 from the power supply management device 100 side has a positive value as illustrated with (e). In this embodiment, occurrence of an inrush current right after the time t3 can be prevented, because the discharge of the first capacitor 24 and the second capacitor 28 is already completed as described above.

As described in this embodiment, by detecting the discharge detection signal, the image forming apparatus 1000 can determine whether the discharge of the discharge circuit 3 is completed or not, and allows the primary-side convertor 1 to drive again smoothly when determining the discharge is completed. Conventionally, the completion of the discharge is not detected, so that primary-side convertor 1 needs to wait long enough to ensure discharge before restarting driving, which needlessly lengthens the wait time. On the other hand, in the present embodiment, the primary-side convertor can re-drive smoothly if the discharge is already completed, thereby shortening the wait time and improving the restoration of the power supply.

Next, circuit operations in the image forming apparatus 1000 of which the cover 40 is closed and the cover 40 is opened are described with reference to FIG. 4 and FIG. 5. The internal configurations of control circuit 4 and the internal configuration of the detection circuit 5 are the same as those in FIG. 2, and the description of the internal configurations is omitted regarding FIG. 4 and FIG. 5.

Figure 4:
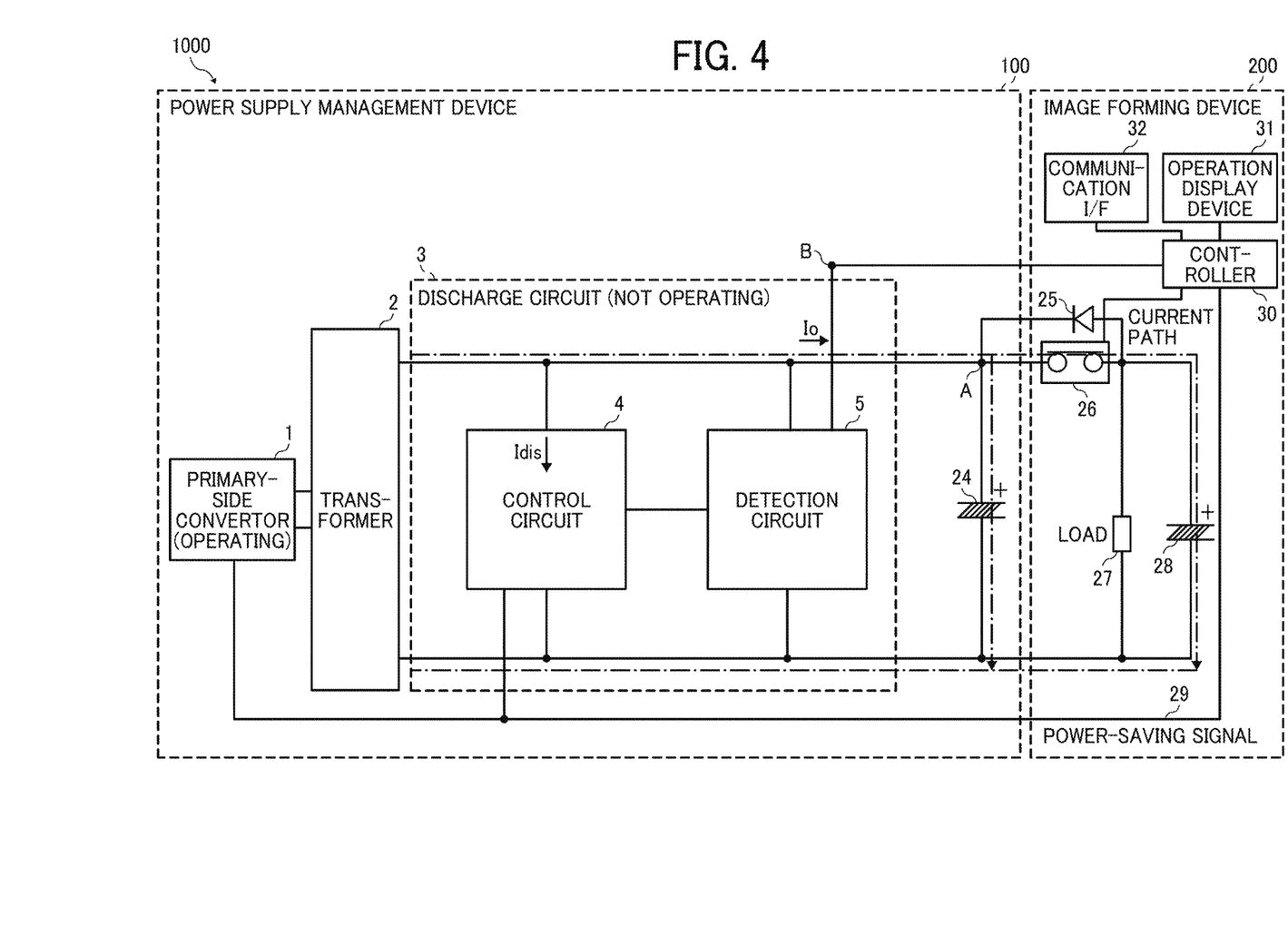
FIG. 4 illustrates circuit operation of the image forming apparatus when the cover is closed.

FIG. 4 is an illustration of the circuit operation under condition where the cover 40 is closed. When the cover 40 is closed, the switch 26 is switched to a closed circuit state (CLOSED) and the power-saving signal 29 turns to the LOW state. When the switch 26 is in the closed circuit state and the power-saving signal 29 is the LOW state, the primary-side convertor 1 operates and the discharge circuit 3 stops the discharge. The power supply management device 100 supplies the power to the load circuit 27 while charging the first capacitor 24 and the second capacitor 28 with the primary-side convertor 1. Under this condition, the discharge current Idis does not flow, the voltage at the point B in FIG. 4, namely the discharge detection signal, is the LOW state. The controller 30, accordingly, detects that the discharge circuit 3 stops the discharge.

Figure 5:
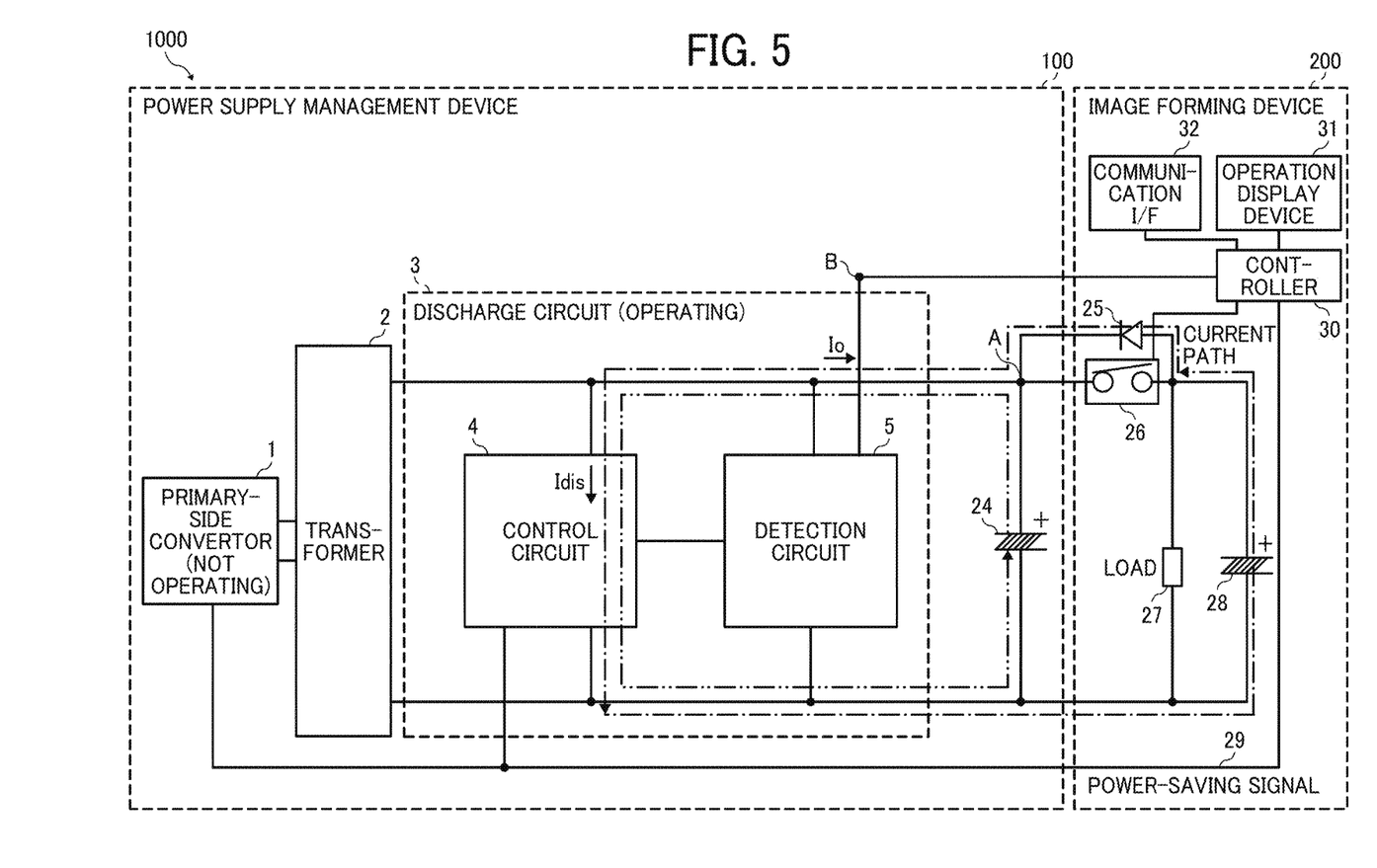
FIG. 5 illustrates the circuit operation of the image forming apparatus when the cover is opened.

FIG. 5 is an illustration of the circuit operation under condition where the cover 40 is opened. When the cover 40 is opened, the switch 26 turns to an open circuit state (OPEN) and the power-saving signal 29 turns to the HIGH state. When the switch 26 is in the open circuit state and the power-saving signal 29 is in the HIGH state, the primary-side convertor 1 stops operating and the discharge circuit 3 starts the discharge. The charge stored in the first capacitor 24 and the second capacitor 28 during the charging as illustrated in FIG. 4 is discharged with the constant current through the discharge path of the control circuit 4. The discharge path includes the FET 16, the sixth resistor 15, and the seventh resistor 17, which are illustrated in FIG. 2. The discharge current Idis flows through the discharge path. The charge stored in the second capacitor 28 is discharged through the diode 25 connected to the switch 26 in parallel. While the discharge current Idis is flowing, the voltage at the point B in FIG. 4, namely the discharge detection signal, is the HIGH state. The controller 30, accordingly, detects the discharge circuit 3 is performing the discharge.

As described above, the discharge circuit 3 includes the detection circuit 5, and the detection circuit 5 outputs the discharge detection signal indicating a discharging state to the controller 30. This allows the controller 30 to determine whether the discharge is completed or not, and restores the power supply operation safely after the discharge is completed. Accordingly, the inrush current occurring by restoring the power supply operation before the completion of the discharge can be prevented.

Next, a method of detecting a damage to the discharge circuit 3 is described with reference to FIG. 6 and FIG. 7. In this embodiment, the damage to the discharge circuit 3 can be detected by detecting a state of a short circuit or an open circuit using the discharge detection signal.

The method of detecting the short circuit in the discharge circuit 3 is described below.

Figure 6:
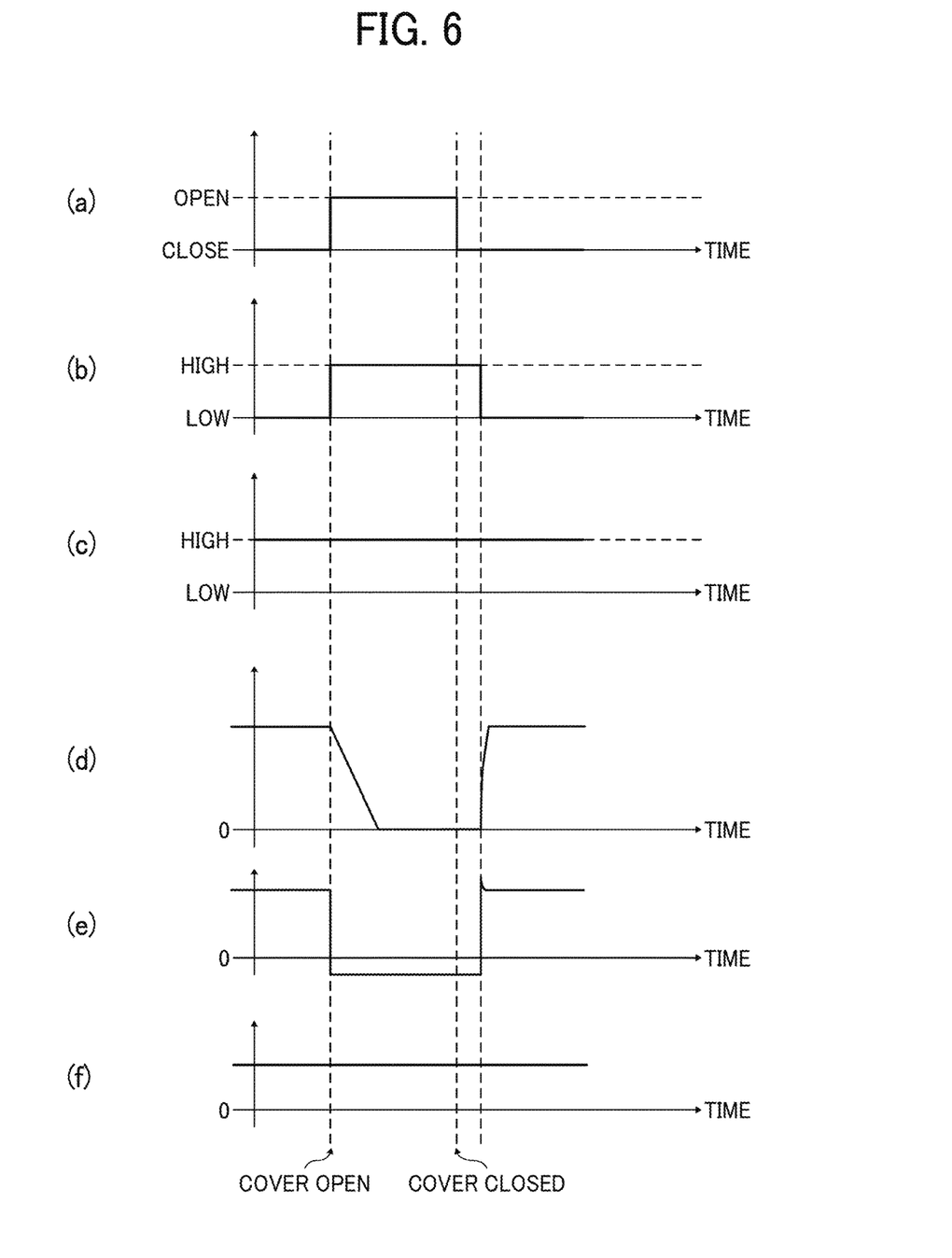
FIG. 6 is a timing chart illustrating the operation of the image forming apparatus when a discharge circuit is short-circuited.

FIG. 6 shows timing charts, (a) to (f), illustrating states in the image forming apparatus 1000 with which the discharge circuit 3 is damaged due to the short circuit fault. In FIG. 6, the timing charts (a), (b), (c), (d), (e), and (f) illustrate the state of the switch 26, the state of the power-saving signal 29, the state of the discharge detection signal, the voltage at the point A, the state of the current Io, and the state of the discharge current Idis, respectively.

In the discharge circuit 3, for example, when the FET 16 (See FIG. 2) is shorted, the discharge path including the FET 16, the sixth resistor 15, and the seventh resistor 17 is always electrically conducted. Under this condition, the discharge circuit 3 is in the discharging state regardless of the state, open/closed, of the switch 26 and the state, HIGH/LOW, of the power-saving signal 29.

That is, the discharge current Idis continuously flows regardless of the state, open/closed, of the switch 26 and the state, HIGH/LOW, of the power-saving signal 29, as illustrated with (f) of FIG. 6. Additionally, the detection circuit 5 continuously outputs the HIGH state of the discharge detection signal to the controller 30 as illustrated with (c) of FIG. 6.

Accordingly, when the power-saving signal 29 is the LOW state, namely when the discharge circuit 3, which is not broken but operating in a normal state, is not performing the discharge, it can be recognized that the discharge circuit 3 is electrically short-circuited if the discharge detection signal keeps the HIGH state without changing.

By using this, the controller 30 according to the embodiment reads the discharge detection signal when, for example, the power supply management device 100 starts operating, and determines that the FET 16 of the discharge circuit 3 is electrically short-circuited if the discharge detection signal keeps the HIGH state without changing.

Subsequently, the controller 30 causes the operation display device 31 to display to indicate that the FET 16 of the discharge circuit 3 is electrically short-circuited or display a corresponding error number. Accordingly, in this embodiment, the short circuit of the discharge circuit 3 can be found in an early stage.

A method of detecting the open circuit of the discharge circuit 3.

Figure 7:
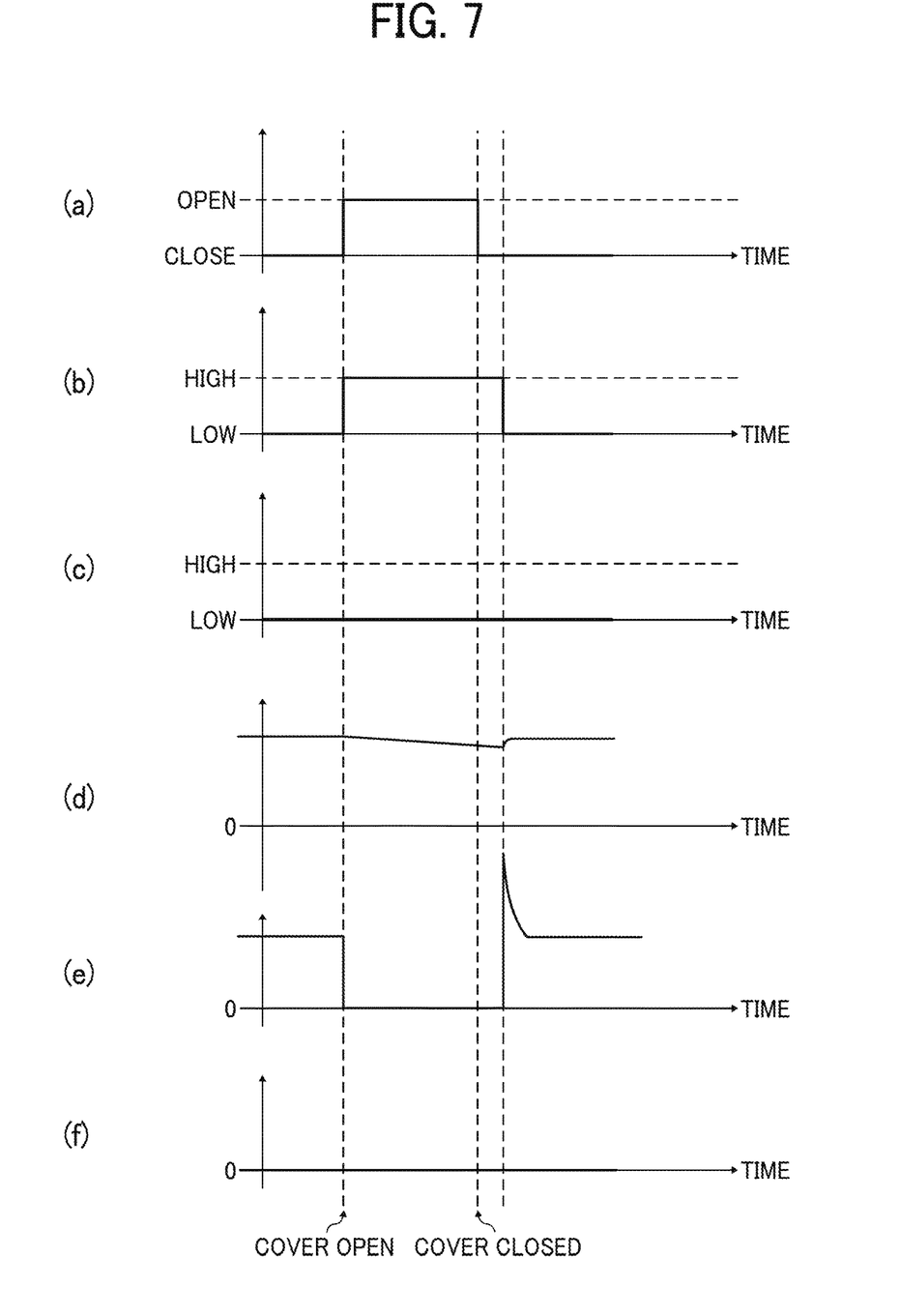
FIG. 7 is a timing chart illustrating the operation of the image forming apparatus when the discharge circuit is open-circuited.

FIG. 7 shows timing charts (a) to (f) illustrating states in the image forming apparatus 1000 with which the discharge circuit 3 is damaged due to the short circuit fault. In FIG. 7, the timing charts (a), (b), (c), (d), (e), and (f) illustrate the state of the switch 26, the state of the power-saving signal 29, the state of the discharge detection signal, the voltage at the point A, the state of the current Io, and the state of the discharge current Idis, respectively.

In the discharge circuit 3, for example, when the FET 16 (See FIG. 2) is broken due to the open circuit, the discharge path including the FET 16, the sixth resistor 15, and the seventh resistor 17 is always disconnected, and the discharge circuit 3 cannot perform the discharge regardless of the state, open/closed, of the switch 26 and the state, HIGH/LOW, of the power-saving signal 29.

That is, as described with (f) of FIG. 7, the discharge current Idis keeps zero regardless of the state, open/closed, of the switch 26 and the state, HIGH/LOW, of the power-saving signal 29. Additionally, the detection circuit 5 continuously outputs the LOW state of the discharge detection signal to the controller 30 as illustrated with (c) of FIG. 7.

Accordingly, when the power-saving signal 29 is the HIGH state, namely when the discharge circuit 3, which is not broken but operating in the normal state, is performing the discharge, it can be recognized that the discharge circuit 3 is open-circuited if the discharge detection signal keeps the LOW state without changing.

By using this, the controller 30 reads the discharge detection signal when, for example, the power supply management device 100 stops operating, and determines that the FET 16 of the discharge circuit 3 is open-circuited if the discharge detection signal keeps the LOW state without changing. Subsequently, the controller 30 causes the operation display device 31 to display to indicate that the FET 16 of the discharge circuit 3 is open-circuited or display a corresponding error number. Accordingly, in this embodiment, the open circuit of the discharge circuit 3 can be found in an early stage.

Accordingly, the detection circuit 5 serves as an abnormality detection circuit to detect an abnormality, as described above.

As described above, the image forming apparatus 1000 according to the embodiments detects the completion of the discharge of the discharge circuit 3 according to the voltage in the discharge circuit 3, namely the discharge detection signal, and restoring the power supply operation of the primary-side convertor 1 if detecting the completion of the discharge. According to the embodiments, the occurrence of inrush current can be prevented without setting the wait time conventionally used to be required to discharge, resulting in improvement in restoration of the power supply operation.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic apparatus, comprising:
   a cover to open or close;
   a convertor configured to control supply of power to a load according to a state of a switch and an operational mode of the electronic apparatus, the state of the switch being switched according to opening or closing of the cover,
   the convertor supplying
   the power when the switch is in a closed state and when the operational mode is an operating mode causing a load output, and stopping supplying the power when the switch is in an open state and the operational mode is a sleep mode causing the load output to stop;
   a discharge circuit configured to discharge a capacitor of a power supply when the convertor stops operating; and
   a controller configured to detect completion of discharge performed with the discharge circuit according to a voltage in the discharge circuit, and to restore operation of the convertor in response to a detection of the discharge completion detector indicating the completion of the discharge of the capacitor, when the switch is in the closed state and when the operational mode is switched from the sleep mode to the operating mode.

2. The electronic apparatus of claim 1, further comprising:
   a display device to report an abnormality of the discharge circuit in response to a detection indicating the abnormality of the discharge circuit, the abnormality being detected based on the state of the switch and the voltage in the discharge circuit.

3. The electronic apparatus of claim 1, further comprising:
   a display device to report that the discharge circuit is electrically short-circuited when the voltage in the discharge circuit is a high state, regardless of the state of the switch.

4. The electronic apparatus of claim 1, further comprising:
   a display device to report that the discharge circuit is electrically open-circuited when the voltage in the discharge circuit is a low state, regardless of the state of the switch.

5. An electronic apparatus, comprising:
   a cover to open or close;
   a convertor configured to control supply of power to a load according to a state of a switch and an operational mode of the electronic apparatus, the state of the switch being switched according to opening or closing of the cover,
   the convertor supplying the power when the switch is in a closed state and when the operational mode is an operating mode causing a load output, and stopping supplying the power when the switch is in an open state and the operational mode is a sleep mode causing the load output to stop;
   a discharge circuit configured to discharge a capacitor of a power supply when the convertor stops operating;
   a discharge completion detector configured to detect completion of discharge performed with the discharge circuit according to a voltage in the discharge circuit, and
   a power supply restoration device configured to restore operation of the convertor in response to a detection of the discharge completion detector indicating the completion of the discharge of the capacitor, when the switch is in the closed state and when the operational mode is switched from the sleep mode to the operating mode.

6. A method of controlling power supply to an electronic apparatus, comprising:
   with a converter, controlling power supply to a load according to a state of a switch and an operational mode, the state of the switch being switched according to opening or closing of a cover of the electronic apparatus,
   the controlling including:
   supplying the power when the switch is in a closed state and when the operational mode is an operating mode causing a load output; and
   stopping supplying the power when the switch is in an open state and when the operational mode is a sleep mode causing the load output to stop;
   with a discharge circuit, discharging a capacitor located on a power supply side when the convertor stops operating;
   detecting completion of discharge performed with the discharge circuit according to a voltage in the discharge circuit; and
   restoring operation of the convertor in response to the detecting the completion of the discharge of the capacitor, when the switch is in the closed state and when the operational mode is switched from the sleep mode to the operating mode.

* * * * *